United States Patent
Adam et al.

(10) Patent No.: US 6,528,143 B1
(45) Date of Patent: Mar. 4, 2003

(54) MULTILAYER MATERIAL FOR PLAIN BEARING AND METHOD OF MAKING SAME

(75) Inventors: Achim Adam, Nauheim (DE); Karl-Heinz Gruenthaler, Usingen (DE)

(73) Assignee: Federal-Mogul Wiesbaden GmbH & Co. KG (DE)

(*) Notice: Subject to any disclaimer, the term of this patent is extended or adjusted under 35 U.S.C. 154(b) by 0 days.

(21) Appl. No.: 09/101,980

(22) PCT Filed: Jan. 23, 1997

(86) PCT No.: PCT/DE97/00169
§ 371 (c)(1),
(2), (4) Date: Jul. 30, 1998

(87) PCT Pub. No.: WO97/28380
PCT Pub. Date: Aug. 7, 1997

(30) Foreign Application Priority Data

Jan. 31, 1996 (DE) .......................... 196 03 353

(51) Int. Cl.$^7$ .................. B32B 15/04; B32B 15/08; B32B 27/18; B32B 27/20; B32B 27/28

(52) U.S. Cl. .................. 428/141; 428/141; 428/213; 428/215; 428/218; 428/339; 428/323; 428/327; 428/421; 428/422; 428/461; 428/463; 427/189; 427/190; 427/195; 427/355; 427/359; 427/384; 427/388.1; 427/475; 427/485; 427/486

(58) Field of Search .................. 428/323, 327, 428/330, 421, 422, 461, 463, 141, 457; 524/515, 520, 544, 545, 546; 525/199; 427/543, 544, 475, 485, 180, 372.2, 375, 384, 288.1, 355, 359, 369, 371

(56) References Cited

U.S. PATENT DOCUMENTS

| | | | | |
|---|---|---|---|---|
| 3,531,432 A | * | 9/1970 | Graver | 260/41 |
| 4,725,151 A | * | 2/1988 | Orndorff, Jr. | 384/98 |
| 4,735,982 A | * | 4/1988 | Orndorff, Jr. | 524/269 |
| 4,812,367 A | * | 3/1989 | Bickle | 428/332 |
| 5,153,253 A | * | 10/1992 | Moisey et al. | 524/439 |
| 5,686,176 A | * | 11/1997 | Adams et al. | 428/327 |

FOREIGN PATENT DOCUMENTS

| | | | |
|---|---|---|---|
| DE | 29 28 081 A1 | | 1/1981 |
| DE | 3301167 A1 | * | 7/1984 |
| DE | 36 01 569 A1 | | 7/1987 |
| GB | 2055875 A | * | 3/1981 |
| JP | 05-295209 A | * | 11/1993 |

\* cited by examiner

*Primary Examiner*—Vivian Chen
(74) *Attorney, Agent, or Firm*—Reising, Ethington, Barnes, Kisselle, Learman & McCulloch, P.C.

(57) ABSTRACT

A multilayer material for sliding elements with a metallic backing layer and a plastics overlay applied thereto achieves good adhesion to the substrate without the disadvantages of known PVDF-based bearing materials. The plastics overlay comprises a PVDF content of 60–95 vol. %, the remainder consisting of PTFE or PTFE and at least one further component with a density of <7 g/cm$^3$. The content of this further component may amount to a maximum of 5 vol. %. The other components comprise fully or partially aromatic polymers such as PI, PAE, polyamides, PPS, PES, PEEK, PSU or polyester, carbon variants such as graphite, carbon black, C fibers or coke, as well as MoS$_2$, BN or CaF$_2$ or CaCo$_3$. The production method consists in scattering a powder mixture of these components onto the metallic backing material and then heating it to above the softening point of the PVDF component to form the plastics overlay, the plastics overlay thereafter being rolled smooth.

13 Claims, 1 Drawing Sheet

MULTILAYER MATERIAL FOR PLAIN BEARING AND METHOD OF MAKING SAME

BACKGROUND OF THE INVENTION

1. Field of the Invention

The invention relates to a multilayer material for sliding elements and to the use and production of such a multilayer material.

2. Description of Related Art

Bearing materials with plastics-based overlays are known as single-layer, two-layer or three-layer composite materials: solid plastics bearings, bearings with an outer metallic backing and directly applied or adhered plastics, other such with inner wire meshes, as well as three-layer bearings of backing metal, a sintered porous metal layer and a covering layer formed in the pores. The multilayer materials differ from solid plastics materials, for example by a negligible tendency towards cold flow under load, by substantially better heat conductivity and, in connection therewith, by notably higher possible pv values.

Among three-layer materials, it is possible to distinguish further between those with overlays based on fluorothermoplastics, such as PTFE, PFA, FEP etc., or other plastics such as PEEK, for example. The latter two groups differ in their manner of operation: while, in the case of PTFE-based materials, the bronze intermediate layer is the load-bearing component of the overlay and acts like a filler, the other plastics materials use it only as an anchoring means. On the sliding surface itself the thermoset or thermoplastics material assumes the supporting role of the bronze. If there is sufficient affinity to the metal backing, mechanical anchoring in the bronze framework is also superfluous and the production of true two-layer materials is possible.

The production of such two-layer materials may be advantageous owing to a reduction in costs connected therewith, but it also opens up the possibility of using different backing materials from usual, since their use here is not dependent on the adhesion of the porous bronze layer conventionally sintered thereto.

A PVDF/PTFE-based material is known from DE-OS 19 25 000 which is described only as a solid plastics material and contains as an additional additive from 5 to 35% of low-molecular weight fluoropolymers. These are described as being indispensable if adequate stability of the moulding is to be achieved. The material may also contain 10–25 parts of non-metallic fillers, in order to improve wear properties.

DE-OS 18 06 551 proposes a method of coating metal sheets which are for use in building and must therefore comprise suitable corrosion protection. Between the metal sheet and a PVF coating it is necessary to provide a primary coupling layer of metal oxides and PVF to aid bonding.

DE-OS 24 36 424 describes a method by which adhesion between fluoroplastics, which are used without additives, and a metal substrate is improved by the breakdown of internal stresses. This is described as follows: the fluoroplastics are held on the substrate firstly for a few minutes above melting point, then for a few minutes just below melting point. These materials are not used for sliding elements.

These prior publications all comprise the use of additional coupling agents or elaborate heat treatment. It should also be noted that a layer whose adhesion is substantially impaired by internal stress is unsuitable for the conventional process of producing plain bearings coated with plastics material, since considerable deformation may have to be undertaken after coating without this resulting in a loss of adhesive power.

In EP 0 340 839 B1 a powder mixture consisting of PVDF, PTFE and lead or another metal with a high affinity for fluorine is applied to a metal strip and then exposed for from 5 to 50 mins to a temperature above the decomposition temperature of PVDF, whereby particularly good tribological properties are said to be achieved.

DE-OS 29 28 081 relates to the production of two-layer materials of steel, a PVDF-based plastics overlay being applied. PTFE, $MoS_2$ or graphite are used as additives. Moreover, additional substances with a density $\geq 8$ g/cm$^3$ have also to be provided in this bearing material in an amount of from 5 to 35%. These are essentially metal components such as lead, lead oxide and the like, which are intended to increase surface bonding to the substrate. It is further proposed, with the aid of the solvent DMF, to produce a dispersion-type mixture from the overlay components and to apply it to the metal backing.

All these materials have the disadvantage that poisonous metals or metal compounds are provided and their production is effected with the aid of solvents or even by releasing poisonous decomposition products.

A bearing material similar to that in DE-OS 2928081 is described in EP 0 430 324 A1. It consists of 5–30% PTFE, 5–60% bronze and 1–20% graphite in a PVDF matrix. The disadvantage of this bearing material consists in the fact that, from the beginning, a bronze component is constantly involved in the friction process. In the case of matrix materials such as PVDF, this impairs dry running properties. Therefore, the description of this invention mentions only lubricated applications, especially shock-absorbers.

SUMMARY OF THE INVENTION

The problem on which the invention is based is that of providing a multilayer material which is characterised by good adhesion to the substrate without the disadvantages of the known PVDF-based bearing materials, as well as a method for the production thereof.

DETAILED DESCRIPTION OF THE PREFERRED EMBODIMENTS

Figure 1:
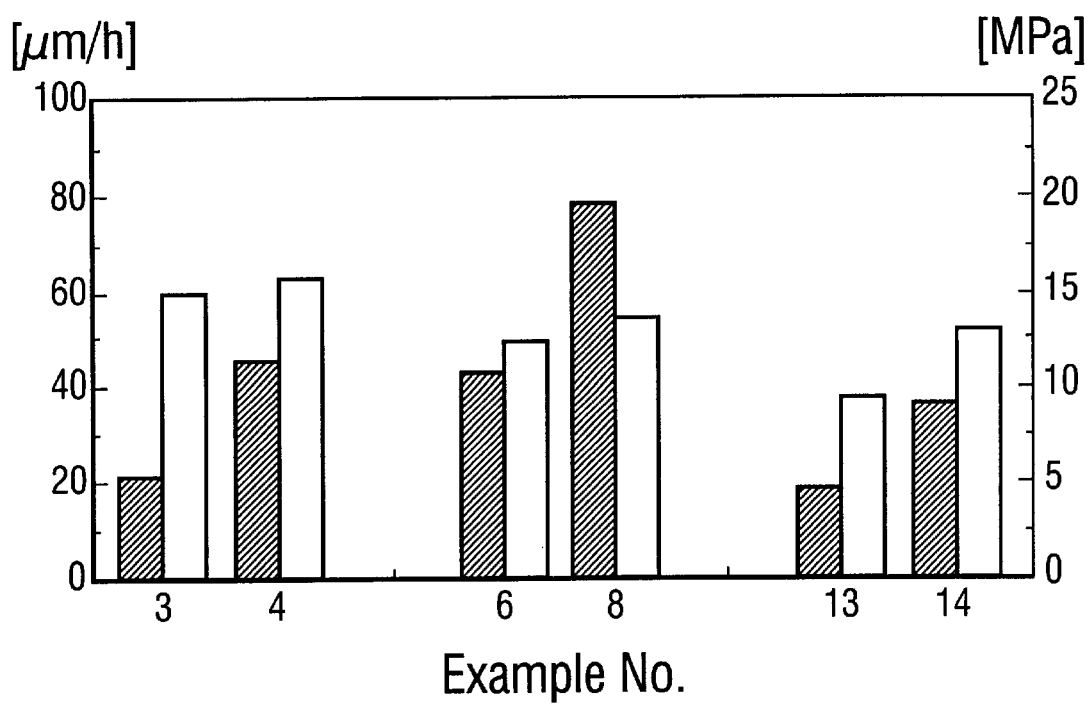
FIG. 1 is a graphical representation comparing wear rates to combined tension and shear resistance for three pairs of examples referred to in the Specification.

It has surprisingly been shown that very good adhesion of the plastics overlay to the metallic backing material may be achieved if the plastics overlay comprises a high PVDF content of 60–95 vol. % and the percentage by volume of the second component or other components does not exceed 40%. The second component may consist exclusively of PTFE or of PTFE and at least one other component, whose density is <7 g/cm$^3$, this percentage by volume preferably being limited to a maximum of 5%. Thus, in particular the components lead, tin, zinc, indium, thallium, cadmium, bismuth, copper or silver or compounds or alloys thereof are ruled out.

It has further surprisingly emerged that the multilayer material according to the invention does not exhibit any losses in tribological properties with respect, for example, to lead-modified variants, but rather, in contrast, these properties are in fact markedly improved, which finds expression in better wear resistance.

Particularly good mechanical and tribological properties are achieved if the PVDF content is between 70 and 88 vol. % and the PTFE content is between 12 and 30 vol. %. The other components or fillers should preferably come from the group of fully or partially aromatic polymers such as PI, PAI, polyamides, PPS, PES, PEEK, PSU or polyester, the carbon variants such as graphite, carbon black, C fibres or coke, as well as the solid lubricants such as $MoS_2$, BN or $CaF_2$ or $CaCo_3$, either individually or in combination.

Particularly good adhesion of the plastics overlay to the substrate may be noted if the backing material has a surface roughness $R_z$ of more than 10 µm, preferably more than 30 µm. The plastics overlay may be applied to a steel strip, for example, without the need for an intermediate layer, such as a porous sintered bronze layer for example, though this is not ruled out.

Apart from steel, the metallic backing material may be stainless steel, a copper alloy, aluminium or an aluminium alloy or a multilayer combination of these materials.

The thickness of the plastics overlay over the backing material preferably amounts to 20–400 µm.

The method of producing a multilayer material is characterised in that there is produced a powder mixture of 60–95 vol. % PVDF, the remainder being PTFE or PTFE and at least one further component with a density of <7 g/cm³, in that the powder mixture is scattered onto the metallic backing material and then heated to above the softening point of the PVDF component to form the plastics overlay and in that the plastics overlay is thereafter rolled smooth. Up to 5 vol. % of the other component(s) is preferably added.

For good processability during homogenisation and application of the powder mixture, the particle sizes should be between 40 and 180 µm in the case of PVDF and between 20 and 140 µm in the case of PTFE. Regenerate powder has proven particularly advantageous as a PTFE variant. Regenerate powder is understood to be sintered, ground PTFE.

In Table 1 below, the advantageous combinations of properties resulting from materials according to the invention applied to steel are clarified with the aid of Examples and compared with the prior art. The measurements given for combined tension and shear resistance were carried out on samples with a square adhesion area of 25×25 mm at an expansion rate of 5 mm/min. The metal strips to be adhered were provided with a surface roughness of $R_z$=20 µm. The tribological investigations were carried out in a pin/roller apparatus, the roller diameter being 100 mm and round samples of 10 mm diameter being tested. The specific test load was 17.5 MPa, the sliding speed was 0.5 m/s and the roughness of the roller surface $R_z$=1 µm.

TABLE 1

| No. | Composition (Vol. %) | Rate of wear (µm/h) | Combined tension and shear resistance (MPa) (Steel) |
| --- | --- | --- | --- |
| 1 | 100 PVDF | 75 | 16.0 |
| 2 | 80 PVDF/20 PTFE | 7 | 15.2 |

TABLE 1-continued

| No. | Composition (Vol. %) | Rate of wear (µm/h) | Combined tension and shear resistance (MPa) (Steel) |
| --- | --- | --- | --- |
| 3 | 70 PVDF/30 PTFE | 21 | 15.1 |
| 4 | 70 PVDF/15 PTFE/15 Pb (prior art) | 45 | 15.8 |
| 5 | 79 PVDF/20 PTFE/1 coke | 20 | 15.8 |
| 6 | 70 PVDF/20 PTFE/10 coke | 42 | 12.3 |
| 7 | 55 PVDF/30 PTFE/15 coke | 102 | 7.5 |
| 8 | 65 PVDF/15 PTFE/10 coke/10 Pb | 78 | 13.6 |
| 9 | 74 PVDF/18 PTFE/8 $Si_3N_4$ | 94 | 13.4 |
| 10 | 72 PVDF/18 PTFE/10 C fibres | 39 | 15.4 |
| 11 | 74 PVDF/18 PTFE/8 PI | 16 | 13.9 |
| 12 | 69 PVDF/17 PTFE/14 PI | 25 | 12.6 |
| 13 | 63 PVDF/16 PTFE/21 PI | 17 | 9.4 |
| 14 | 62 PVDF/15 PTFE/13 PI/10 Pb | 36 | 13.0 |

TABLE 2

Table 2 contains results obtained with other backing materials:

| No. | Composition (Vol. %) | Rate of wear (µm/h) | Combined tension and shear resistance (MPa) (Steel) |
| --- | --- | --- | --- |
| 15 | 100 PVDF | 14.8 | Al |
| 16 | 80 PVDF/20 PTFE | 14.7 | Al |
| 17 | 70 PVDF/15 PTFE/15 Pb (prior art) | 14.4 | Al |
| 18 | 79 PVDF/20 PTFE/1 coke | 15.2 | CuSn10 |
| 19 | 70 PVDF/20 PTFE/10 coke | 13.0 | CuSn10 |
| 20 | 65 PVDF/15 PTFE/10 coke/10 Pb | 14.0 | CuSn10 |

The results show that the adhesion in the composition range investigated is only insubstantially influenced and a variation in filler content within the limits according to the invention as well as of the backing material is possible extensively without impairing adhesion. Only with combined tension and shear resistance values below 11.5 MPa need the appearance of detachment phenomena during the forming processes be taken into account.

Pure PVDF exhibits the best adhesion, but inadequate wear properties. Above 40% total filler, the production of the above-described two-layer material is no longer sensible owing to layer detachment. From Example 2 it is also clear that, when the composition is optimised by the complete omission of other additives, a marked advantage may be achieved with respect to the prior art. Example 4 uses a commercially available material composition, thereby representing the prior art in PVDF-based materials.

A comparison of the pairs 3 and 4, 6 and 8, and 12 and 14 of the Examples shows that, although an improvement in combined tension and shear resistance may be achieved by the addition of lead, in all instances the wear resistance is reduced by about half. Although lead may be used to provide a degree of compensation for the loss of adhesion in the case of a decreasing PVDF component, the effect on tribological properties is negative. This fact is represented graphically in FIG. 1, for the sake of clarification. The wear rates are assigned to the left axis and represented by hatching and the combined tension and shear resistances are assigned to the right axis and represented in white.

To summarise, therefore, from whatever point of view it is looked at, a better performance is achieved overall by the PVDF/PTFE system than by the PTFE/PVDF/adhesion improver (e.g. Pb) system. The plain bearing materials according to the invention may advantageously be used unlubricated but also in the presence of greases or oils such as in the case of shock absorber rod guide members for example.

Obviously, many modifications and variations of the present invention are possible in the light of the above teachings. It is, therefore, to be understood that within the scope of the appended claims, the invention may be practiced otherwise than as specifically described.

What is claimed is:

1. Laminated material for sliding elements comprising a metallic base layer and a plastic sliding layer applied to said metallic base layer, said sliding layer having a matrix of PVDF material present in an amount ranging from 60–95 vol. %, and the balance consisting of PTFE, or PTFE and at least one further component embedded in the PVDF matrix as a filler, said further component having a density less than 7 g/cm$^3$ selected from the group consisting of: fully or partially aromatic polymers of PI, PAI, polyamide, PPS, PES, PEEK, PSU and polyester; carbon variants of graphite, soot, C fibres and coke; and $MOS_2$, BN and $CaF_2$ compounds.

2. Material according to claim 1 wherein the percentage of said further component amounts to a maximum of 5 vol. %.

3. Material according to claim 1 wherein the PVDF component amounts to 70–88 vol. %.

4. Material according to claim 3 wherein the PTFE component amounts to 12–30 vol. %.

5. Material according to claim 1 wherein the base layer has a surface roughness $R_z$ of more than 10 μm.

6. Material according to claim 5 wherein the base layer has a surface roughness $R_z$ of more than 30 μm.

7. Material according to claim 1 wherein the metallic base layer is fabricated from a material selected from the group consisting of: steel, stainless steel, a copper alloy, aluminum or an aluminum alloy and multi-layer combinations of these materials.

8. Material according to claim 1 wherein the plastic sliding layer has a thickness of between 20–400 μm.

9. Method for the production of a laminated material, in which a plastic sliding layer is applied to a metallic base layer, said method including: producing a powder mixture from 60–90 vol. % PVDF and the balance cosisting of PTFE, or PTFE and at least one further component having a density less than 7 g/cm$^3$ selected from the group consisting of: fully or partially aromatic polymers of PI, PAI, polyamide, PPS, PES, PEEK, PSU and polyester; carbon variants of graphite, soot, C fibres and coke; and $MOS_2$, BN and $CaF_2$ compounds; sprinkling the powder mixture onto the metallic base material and heating the powder mixture to above the softening point of the PVDF component to form the plastic sliding layer; and rolling the plastic sliding layer smooth.

10. Method according to claim 9 including selecting a PVDF powder with a grain size between 40 and 180 μm and a PTFE powder with a grain size between 20 and 140 μm for use in the powder mixture.

11. Method according to claim 10 wherein the grain size of the PVDF powder is selected to lie between 70 and 130 μm and that of the PTFE powder to lie between 60 and 100 μm.

12. Method according to claim 9 including employing regenerated PTFE powder as the PTFE powder in the powder mixture.

13. Method according to claim 9 including applying the plastic sliding layer directly onto the metallic base layer.

* * * * *